(12) United States Patent
Shunk et al.

(10) Patent No.: US 9,117,186 B2
(45) Date of Patent: Aug. 25, 2015

(54) JOINT MARKETED CUSTOMER HUB

(71) Applicant: CELLCO PARTNERSHIP, Basking Ridge, NJ (US)

(72) Inventors: Christopher J. Shunk, Easton, PA (US); Bhaskar Srinivasiah, Johns Creek, GA (US); Lisa Jenzeh, Wayland, MA (US)

(73) Assignee: Cellco Partnership, Basking Ridge, NJ (US)

( * ) Notice: Subject to any disclaimer, the term of this patent is extended or adjusted under 35 U.S.C. 154(b) by 295 days.

(21) Appl. No.: 13/683,830

(22) Filed: Nov. 21, 2012

(65) Prior Publication Data

US 2014/0142997 A1   May 22, 2014

(51) Int. Cl.
*G06Q 10/00* (2012.01)
*G06Q 30/00* (2012.01)
*G06Q 10/06* (2012.01)

(52) U.S. Cl.
CPC .................................. *G06Q 10/063* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
USPC ........ 705/7.11–7.42, 1, 39, 41; 707/607, 705; 725/9
See application file for complete search history.

(56) References Cited

U.S. PATENT DOCUMENTS

| | | | |
|---|---|---|---|
| 7,437,329 B2 * | 10/2008 | Graves | 705/41 |
| 2008/0014917 A1 * | 1/2008 | Rhoads et al. | 455/422.1 |
| 2009/0164232 A1 * | 6/2009 | Chmielewski et al. | 705/1 |
| 2014/0149283 A1 * | 5/2014 | Roselli et al. | 705/39 |

OTHER PUBLICATIONS

Eve Maler, Drummond Reed, The venn of identity: Options and issues in federated identity management, IEEE Security & Privacy, 2008, http://innovbfa.viabloga.com/files/IEEESecPriv_Venn_of_Identity_2008.pdf.*

* cited by examiner

*Primary Examiner* — Justin M Pats
*Assistant Examiner* — Uche Byrd

(57) ABSTRACT

The instant application describes a method for receiving, at a hub and from a first partner, a request for a common identifier for linking an account of the customer associated with the first partner with an account of the customer associated with a second partner to provide the customer with enhanced joint account services; in response to the request, generating the common identifier and providing the common identifier to the first partner; generating at the hub a common ID status based on a first partner customer ID status and a second partner customer ID status; and forwarding the common ID status to the first partner and the second partner.

19 Claims, 9 Drawing Sheets

JOINT MARKETED CUSTOMER HUB

BACKGROUND

Increasingly, content providers and mobile communication network providers are reaching commercial agreements that may give residential and business services customers more choices, new innovative products, and new mobile experiences. The agreements may also give the customers more ways to experience entertainment, communicate and connect. To take advantage of such joint services, however, a need for a solution exists that would provide a platform for joining and housing accounts of the various companies so that combined service offerings can be facilitated.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
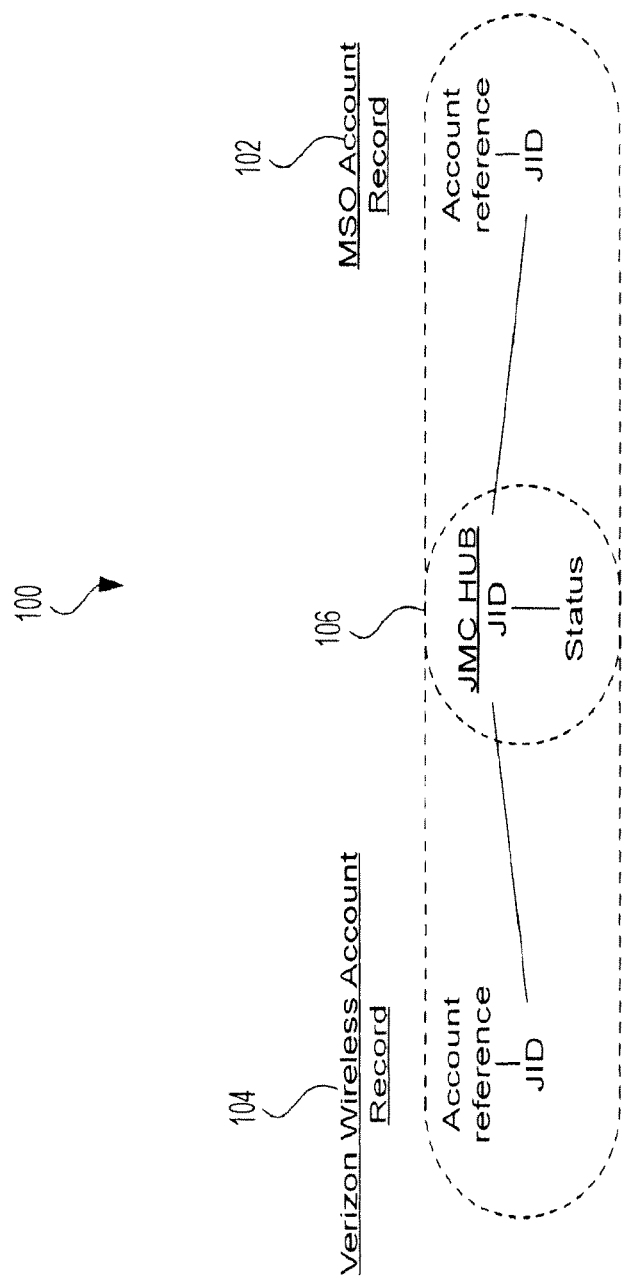
FIG. 1 illustrates an exemplary system for linking an MSO account and a VzW account using a JMC hub.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The instant application describes technology and features that integrate the home and wireless experience. To this end, the instant application describes a Joint Marketed Customer (JMC) hub for establishing a third party system and process to support the technical and operational linking of accounts associated with customers of a mobile communication network provider (e.g., Verizon Wireless™ (VzW)) and a content provider (e.g., MSO) (collectively, partners) who have entered into a joint relationship. The JMC hub may be used when JMC-specific functionality is being utilized and managed to support automation of the processes and functions required to provide JMC's with an overall positive buying and use experience.

The JMC hub may embody a commercial off the shelf (COTS) solution to allow for the lifecycle management and storage of linked accounts via a common identifier (a 'JID'-JMC Identifier). The JMC hub may also allow for state and status management and provide a mechanism for JID assignment and distribution to the partners. In one implementation, upon submission of the wireless order, a request will be provided to the JMC hub to create a JID. The JMC hub may communicate the newly-created JID to VzW and to the cable operator. Each company to which the JID was communicated may store the JID within their respective systems and may communicate its respective JID status to the JMC hub. The JMC hub may derive an overall JID status based upon each company's individual status. The JMC hub may allow customers of both VzW and the cable operators to take advantage of joint promotional offerings and services, thereby facilitating business development.

The JMC hub may include those functions necessary to support the creation and management of the JID. The JMC hub may create the JID based upon triggers/notifications from MSO and/or VzW systems (API based). The JMC hub may perform JMC assignment and mapping via JID Primary to Primary account mapping between MSO and VzW. This may be done with "account numbers." Alternatively or additionally, this may be done with unique identifiers (customer IDs) from the partners. It should also be noted that this is account linkage and not user linkage. In this manner, the JMC hub may resolve the concern from both VzW and the cable provider about sharing customer information across companies. Neither VzW nor cable providers need to own the platform with cross company information. The JMC hub may provide notification to applicable companies as statuses change.

FIG. 1 illustrates an exemplary system 100 for linking an MSO account 102 and a VzW account 104 using a JMC hub 106. The JMC huh 106 may be the owner of the JID and identifier of the JID status. A JID may be generated by the JMC hub in response to specific interactions by VzW and the MSO and may be shared with the partners in such a way as to maintain an accurate reference to two accounts, one in VzW and one in the MSO system. The presence of the JID may indicate that an association has been established between the two accounts.

Figure 2:
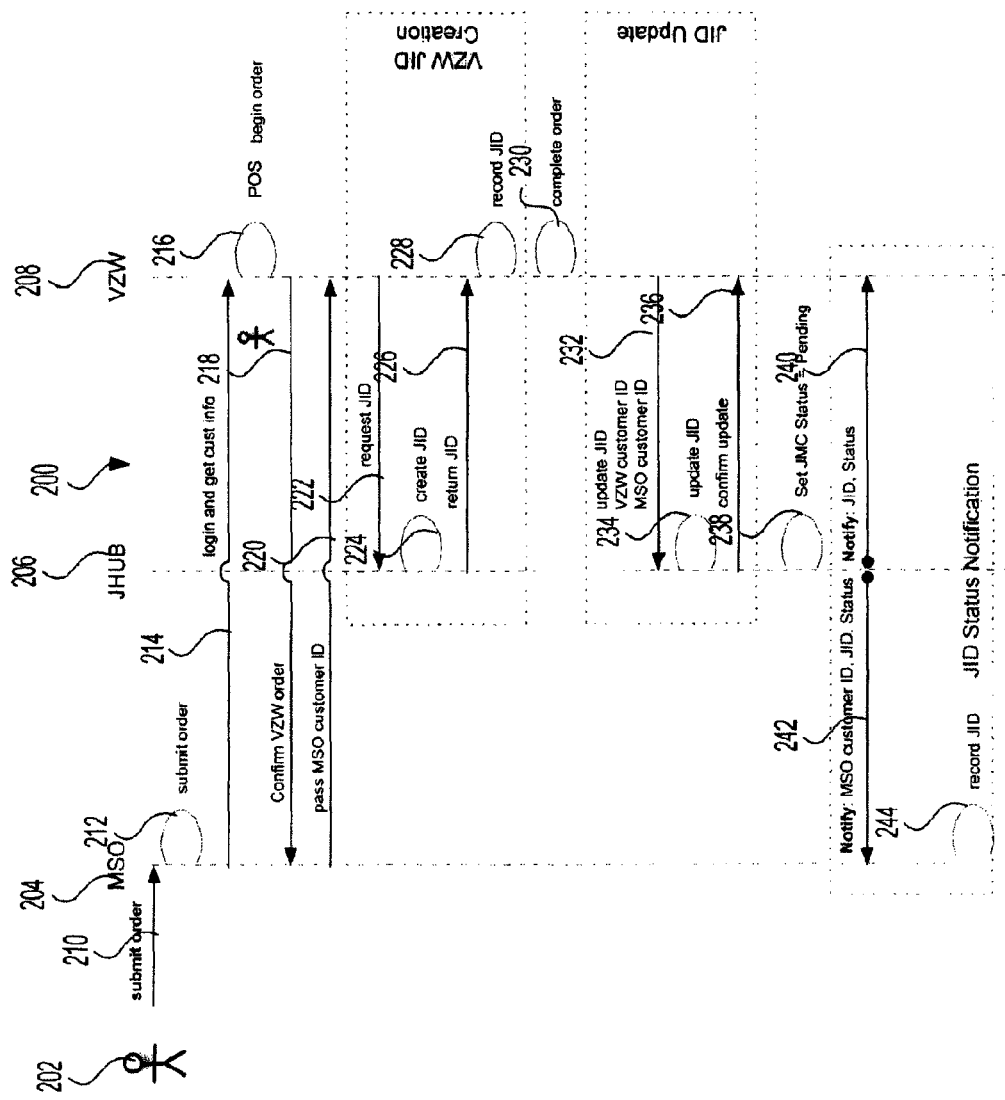
FIG. 2 illustrates an exemplary MSO order process for assignment of JID and linking the MSO and the VzW accounts shown in FIG. 1.
Figure 4:
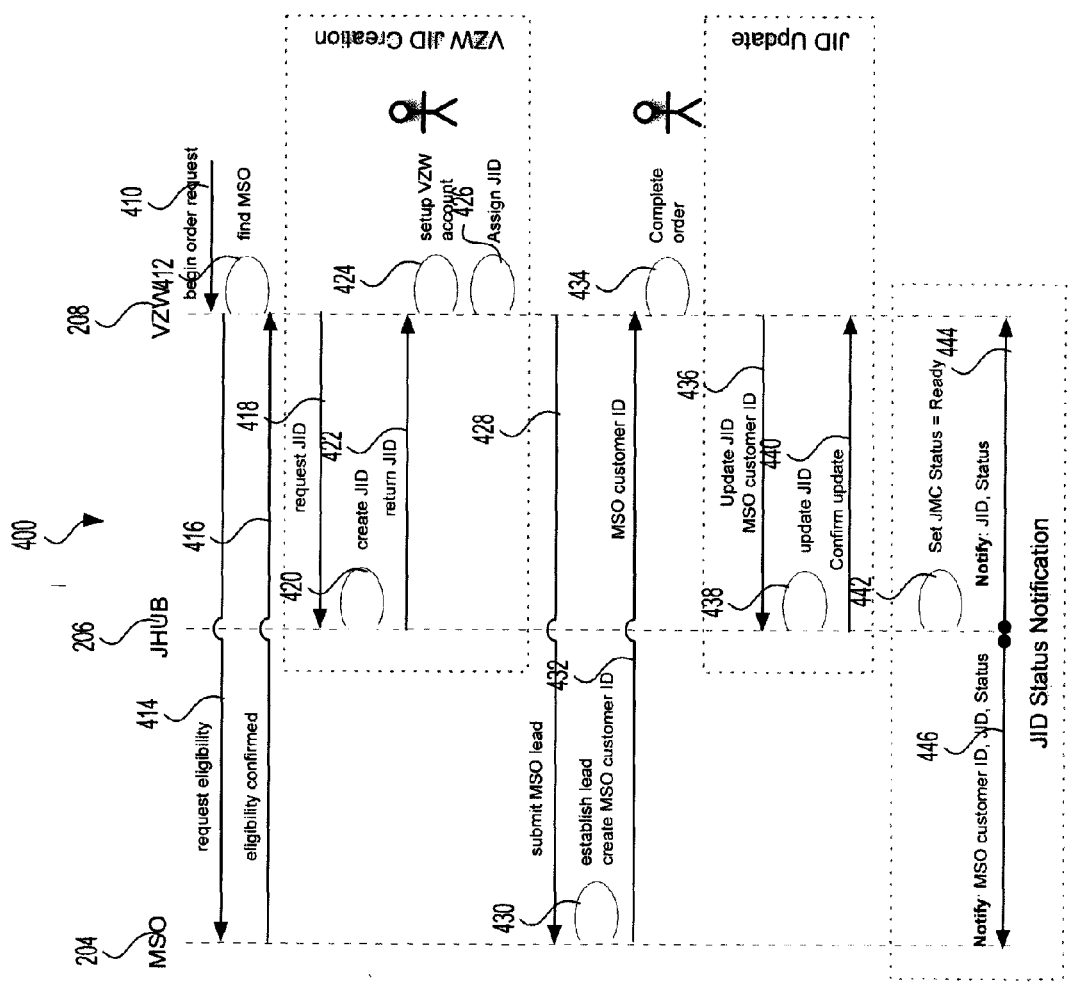
FIG. 4 illustrates an exemplary VzW order process for assignment of JID and linking the MSO and VzW accounts shown in FIG. 1.
Figure 5:
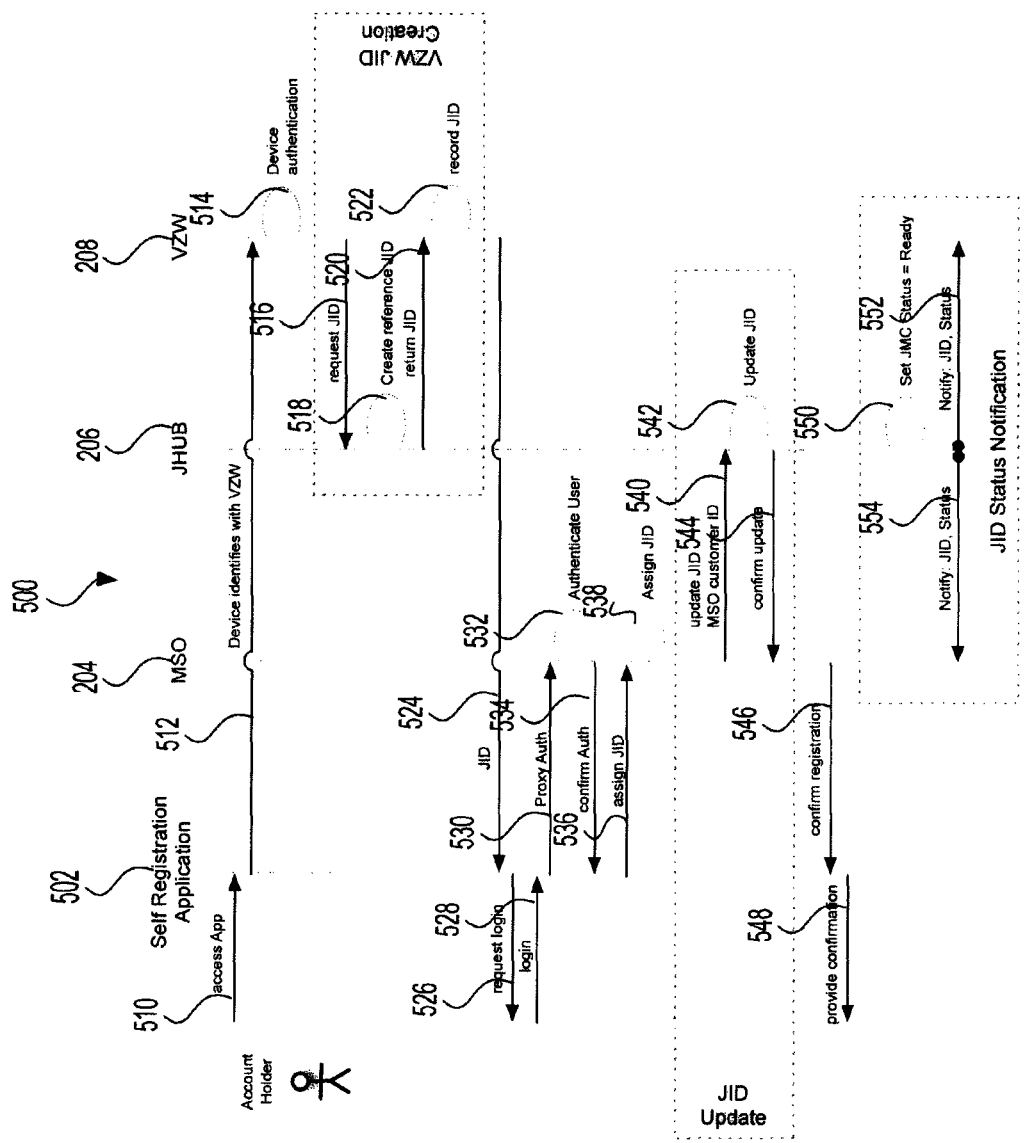
FIG. 5 illustrates an exemplary self registration process for assignment of JID and linking the MSO and VzW accounts shown in FIG. 1.

Assignment of the JID can take place in at least three distinct ways: (1) through an MSO order process that completes both VzW and MSO orders in a two stage manner (swivel chair); (2) through a VzW order process that completes both VzW and MSO orders using an integrated order process/system; and (3) via a self registration process that leverages account or user information from VzW and from the associated MSO to establish the relationship. FIG. 2 illustrates an exemplary MSO order process 200 for assignment of JID and linking accounts 102 and 104. FIG. 4 illustrates an exemplary VzW order process 400 for assignment of JID and linking accounts 102 and 104. FIG. 5 illustrates an exemplary self registration process 500 for assignment of JID and linking accounts 102 and 104.

Referring specifically to FIG. 2, the process 200 describes the use case where orders are taken by an MSO. In this scenario, the processing of the MSO order is distinct from the processing of the VzW order but is undertaken by a single operator (swivel chair). There may be two variants of the MSO submissions. One variant is for existing customers (e.g., a customer that already exists in one or both of VzW and MSO systems and therefore already has accounts to reference). Upon successfully accessing the accounts and confirming the account match, the JID can be assigned and references established. Another variant is for new customers (e.g., customer accounts in the VzW and MSO systems are created during the order process). The JID can be assigned to the newly created accounts; however, due to the nature of the MSO account creation flow, the MSO account may not be considered fully active until a confirmation flow is executed as described in more detail with respect to FIG. 3.

Referring again to FIG. 2, the process 200 begins with the customer 202 (also referred to herein as a user) submitting an order for enhanced services offered by the joint agreement between the MSO 204 and the VzW system 208 to the MSO 204 (Step 210). The enhanced services may include, for example, allowing the customer 202 to view eligible subscribed cable programming on the customer's mobile phone or allowing the customer to view the customer's mobile call logs from the customer's TV. If the order is not for enhanced services, the MSO 204 may handle the order independently, without involving the JHUB 206.

The MSO 204 submits the order in its system (Step 212). If this is a new order, an MSO customer ID may be generated, however, an MSO account may not be activated yet. If this is an update to an existing account then the account will already be active in the MSO system 204. In either case, MSO 204 may make a determination whether the user is eligible for such enhanced services and if not may take specific actions to make the user eligible. For example, if the MSO 204 determines that the user would need to sign a new contract or subscribe to a new service under the existing account, the MSO 204 informs the user of the same. Upon receiving the user's consent to the new agreement, the MSO 204 may approve the user's order request.

Once the MSO 204 determines that the customer 202 is eligible for the enhanced services, the MSO operator may 'swivel-chair' to the VzW order processing system and log in to create an order in the VzW system 208 (Step 214). The operator may be a customer service representative of the MSO 204. The MSO operator may log into the Point of Sale (POS) offering of the VzW system 208. The VzW system 208 includes a POS terminal which is a computerized device installed at a front-end POS to deal with transactions such as opening a new subscriber's account or additional mobile telephones of existing subscribers and handling requests from subscribers regarding billing and/or receiving enhanced services. The POS terminal has front-end application software to perform various transactions and communications with other elements in the VzW system 208. At least logically, the POS terminal may be directly connected to a centralized global router without involvement of any local billing data server hard-wired to the POS terminal. The centralized global router is a device capable of computerized functions and has an Application Programming Interface (API) that allows the POS terminal to access a plurality of geographically-distributed billing data servers that store billing data of subscribers located or homed in the same area as serviced by respective billing data servers.

The POS terminal references the billing data server to determine whether the order for enhanced services is a new order. If this is a new order then a new VzW account is created, otherwise an existing VzW account will be accessed. Upon receiving the order at the VzW system 208, the VzW system 208 begins processing the order (Step 216). As a part of processing the order, the VzW system 208 may review the customer's account to ensure the customer is eligible to receive the service desired from the VzW system 208. The eligibility requirement may vary for different mobile communication network providers. However, in the VzW example, the eligibility requirement may include the customer having a 3G or a more advanced (e.g., 4G) mobile phone. If the user does not meet such eligibility requirement, the user may be instructed to bring himself/herself in compliance with the requirement. For example, the POS terminal may display a message to the user listing the eligibility requirements and highlighting the one the user should satisfy to become eligible for the enhanced services. For another example, an e-mail or an SMS message may be sent to the user's mobile phone listing the eligibility requirements and highlighting the one the user should satisfy to become eligible for the enhanced services. In the VzW example, the user may be instructed to buy a 3G or a 4G mobile device. Upon purchase of the 3G or 4G mobile device, the VzW system 208 may approve the user's order request.

After approving the client's order or during the approval process, the VzW system 208 may send a VzW order confirmation message to the MSO 204 to confirm that the VzW order has been placed (Step 218). In response to receiving the VzW order confirmation message, the MSO 204 may pass the MSO customer ID to the VzW system 208 (Step 220). The MSO operator may manually enter the MSO customer ID into the VzW order processing system 208. This may be the case if the operator corresponds to a customer service representative of the MSO system 204. Alternatively, if the operator corresponds to a software program, the MSO operator may automatically enter the MSO customer ID in the VzW order processing system 208. The VzW system 208 may request the JMC hub 206 for creation of a JID for the customer 202 (Step 222). The request may include a Partner ID identifying the cable partner for which the JID is being requested. The Partner ID identifies the MSO system 204 which has entered into a joint agreement with the VzW system 208 for offering enhanced services. The request may also include the VzW customer ID and the MSO customer ID. The VzW customer ID and the MSO customer ID may be the actual account number associated with an account of the user at VzW system 208 and MSO 204, respectively. Alternatively, the VzW customer ID and the MSO customer ID may be an adhoc/temporary number associated with the account of the user in each of VzW system 208 and MSO 204, respectively. If adhoc/temporary, the customer ID of one entity may be stored in the billing system of the partner and may be associated with the customer account number of the partner. To this end, the partner can reference the number of the one entity stored in the billing system of the partner to determine the user's subscription to the enhanced services. The request may also include VzW user account status information and MSO user account status information. The account status information may describe whether the user is successfully enrolled for receiving enhanced services at the various entities. The request may be submitted through an API and via a secure communication tunnel such as, for example, a Virtual Private Network (VPN) established between the VzW system 208 and the JMC hub 206.

In response, the JMC hub 206 creates the JID (Step 224) and returns the JID to the VzW system 208 (Step 226). To create the JID (Step 224), the JMC hub 206 may use a sequencing tool. The sequencing tool may create a unique JID value. The JID value may be numeric, alphabetic or a combination of numeric and alphabetic characters. The VzW system 208 records the JID in its internal system in association with the VzW customer ID (Step 228). In one example, the VzW system 208 records the JID in a billing system that stores the customer's information. Assuming this is a new order, the VzW system 208 may then mark the order for enhanced services as complete (Step 230). For example, the VzW system 208 may store in customer's profile that the customer has successfully registered for the enhanced services. The VzW system 208 may then update the JID record with the MSO and VzW customer order IDs. The enhanced services may be provided to the user when the JID status is marked as Active as described in more details below.

Specifically, the VzW system 208 may send the VzW customer ID along with the MSO customer ID to the JMC hub 206 (Step 232). In a slightly different implementation, the VzW system 208 may send the VzW customer ID to the JMC hub 206. The VzW system 208 may also forward the JID to the MSO 204 and may request that the MSO 204 forward the MSO customer ID to the JMC hub 204. The MSO 204 may then forward the MSO customer ID along with the JID to the JMC hub 206. Whether the MSO customer ID is sent from the VzW system 208 or the MSO 204 to the JMC hub 206, the JMC hub 206 may update its record to register the VzW customer ID and the MSO customer ID against the JID (Step 234). The JMC hub 206 may start building a record for each of its issued JIDs. The record may include, among others, the MSO customer ID, the VzW customer ID, the status of MSO account, the status of VzW account, and the status associated with the JID. Within the JMC hub 206, the JMC hub 206 calculates the JID status based on the statuses of the VzW account and the MSO account. To this end, part of the information that may be communicated to the JMC hub 206 is the individual partner account statuses. The account status may include ready, pending, active, and/or inactive. Each of the partners may calculate its own account status based on actions specific to the customer's account in the partner.

The ready status may mean that the partner has gained consent from the customer to share customer information across the partner companies. The ready status may also mean that the customer has expressed interest in the enhanced services, has met the partner's requirements to be registered for receiving enhanced services, and is indeed registered for receiving the enhanced services. The customer's account for each of the partners may have to reflect ready before the JID status can be set to ready. The pending status may mean that the customer has to initiate some kind of order that makes the customer eligible for the enhanced services. The account pending status for example may reflect that the customer is in the process of satisfying the partner's requirement for receiving enhanced services. Alternatively or additionally, the pending status may mean that the account supervisor at one or both of the systems 204 and 208 has to approve the enhanced services order for the user's account. As noted above, the VzW requirement may be an active VZW wireless service; whereas the MSO requirement may be registration for Broadband/TV/Voice. Once the partner's requirements are met, the partner updates the customer profile to reflect the new account status of ready for the customer. The new account status may be reported to the JMC hub 206 so that the JMC hub can modify the JID status based on the accounts' statuses. The JID status will be described in more detail below.

Table 100 shows various JID status and their corresponding eligibility criteria.

TABLE 100

| JMC Status | Eligibility Criteria | Consent to Share | Primary Accounts Linked | JMC ID Assigned |
|---|---|---|---|---|
| Ready | Current Customer with VZW and MSO Consent to share provided MSO/VZW accounts linked | Yes | Yes | Yes |
| Pending | Should meet "Ready" Criteria Customer in a pending activate complete state at either VZW or MSO Meets offer eligibility for available JMC offers Selected/Purchased a JMC offer At least one JMC offer/product awaiting activation | Yes | Yes | Yes |
| Active | Should meet "Ready" Criteria Meets offer eligibility for available JMC offers Selected/Purchased a JMC offer JMC offer/product activated | Yes | Yes | Yes |
| Suspend | Should meet "Ready" Criteria Customer in a suspended state at either VZW or MSO Meets offer eligibility for available JMC offers Selected/Purchased a JMC offer JMC offer/product activated | Yes | Yes | Yes |
| Inactive | No longer a current customer with VZW and MSO Consent to share no longer valid In a "Suspend" state beyond the allowed time window | No | No | Yes |
| Null (Default State) | Default State of all customers, no information is maintained | No | No | No |

Referring again to FIG. 2, after updating the JID record with the VzW customer ID and the MSO customer ID (Step 234), the JMC hub 206 confirms the update to the VzW system 208 (Step 236). The JMC hub 206 may then set the status of the JID to pending (Step 238) and may notify the VzW system 208 of the JID pending status (Step 240). The notification message to the VzW system 208 may include the VzW customer ID, JID, and JID status. Alternatively, the notification message to the VzW system 208 may include only the JID and the JID pending status. Similarly, the JMC hub 206 may inform the MSO 204 of the JID and JID pending status (Step 242). The notification message to the MSO 204 may include the MSO customer ID, JID, and JID status. The MSO 204 records JID in the account profile of the user (Step 244). In one implementation, the first status of the JID may be set to pending and may be later modified based on the account status information received from the partners 204 and 208. This will be described in more detail below.

Figure 3:
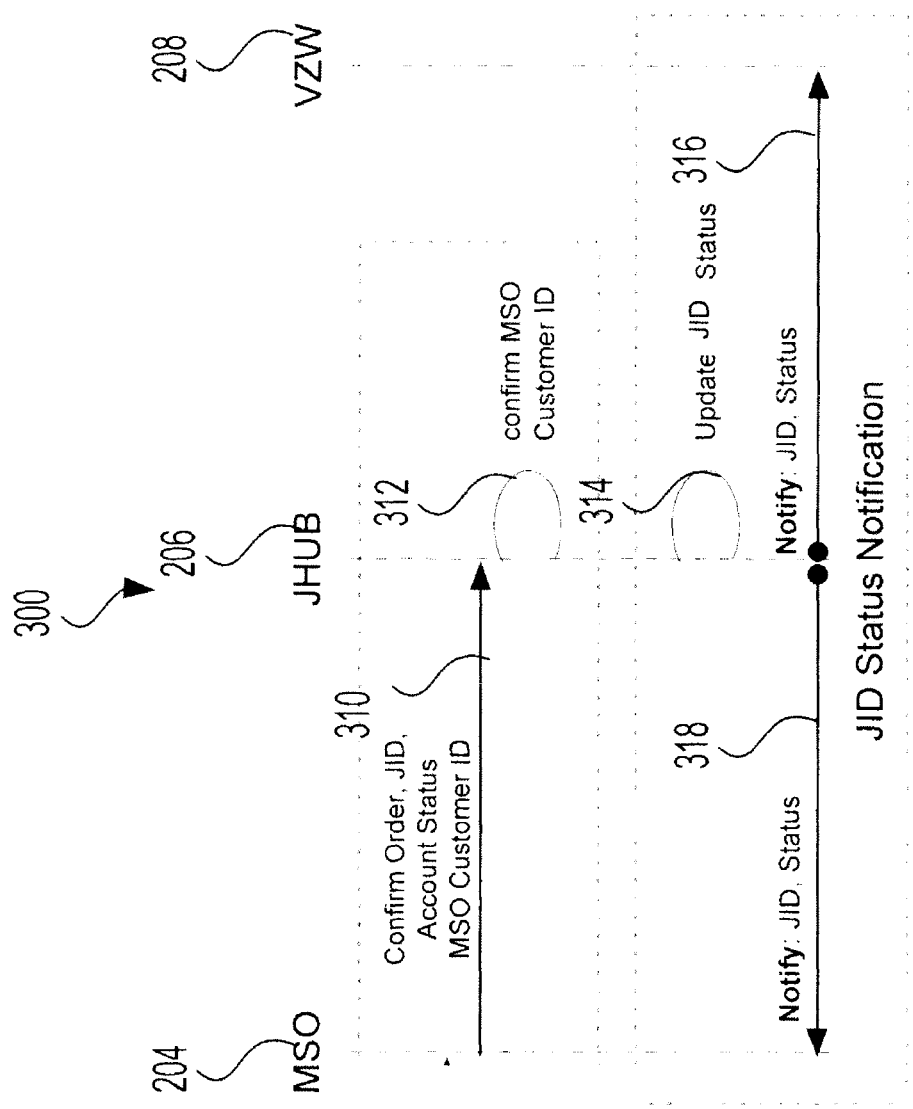
FIG. 3 illustrates an exemplary process for an MSO confirming order to the JMC hub shown in FIG. 1.

FIG. 3 illustrates an exemplary process 300 for MSO 204 confirming an order to the JMC hub 206. The process 300 begins with the MSO 204 sending the confirming order along with the JID, the accounts status, and the MSO customer ID to the JMC hub 206 (Step 310). The confirmation order may be a confirmation that the customer has an account for receiving the MSO enhanced services. The account status may reflect the account is ready for receiving the MSO enhanced services. The JMC hub 206 updates the JID record (Step 312) and also update the JID status (Step 314). For example, if the previous JID status was pending, the JID status may remain pending if the MSO account status is ready and the VzW account status is pending. For another example, the JID status may change from pending to Active if MSO account status is ready and the VzW account status is also ready. After updating the JID status, the JMC hub 206 sends a JID status update to each of the partners (Steps 316 and 318). Although the process 300 is shown for submitting the confirmation order, it may also be used for submitting other information to the JMC hub 206. For example, in FIG. 2, the VzW system 208 provided the JMC hub 206 with the MSO account information. However, the MSO 204 may provide this information to the JMC hub 206 using the process 300. Specifically, the MSO customer ID may be necessary in a scenario in which the MSO 208 does not provide the VzW system 208 with the MSO customer ID as shown in Step 220 of FIG. 2 but instead directly provides the JMC hub 206 with the MSO customer ID.

FIG. 4 illustrates an exemplary VzW order process 400 for assignment of JID and linking accounts 102 and 104. The process 400 describes the use case where orders are taken by VzW system 208. In this use scenario, the VzW system 208 requests an order to be completed by the relevant MSO 204 by notifying the MSO 204 of a pending order for enhanced services. The order may have been submitted as a part of a combined order received at the VzW system 208. The combined order may be an order for both VzW enhanced services and the MSO enhanced services. In one embodiment, during submission to the VzW system 208 for an existing customer (e.g., a customer already has an account in one or both of the VzW system 208 and MSO 204), the JID can be assigned and references established on successfully accessing the accounts in the VzW system 208 and confirming that the accounts match the eligibility requirement. The references may include the association between the JID and the VzW customer ID and the MSO customer ID. The VzW customer ID may be automatically transmitted to the JMC hub 206 as a part of the request for JID. The MSO customer ID may be submitted to the JMC hub 206 from the VzW system 208 or may be directly submitted to the JMC hub 206 from the MSO 204 as described in more details below.

In another embodiment, during submission to the VzW system 208 the JID can be assigned to newly created accounts for new customers (e.g., customer accounts in the VzW system 208 and MSO 204 are created during the order process). However, in this case the MSO account may not be considered fully active until a confirmation flow is executed as shown, for example, in FIG. 3.

The process 400 begins with the customer 202 (also referred to herein as a user) submitting an order for enhanced services offered by the joint agreement between the MSO 204 and the VzW system 208 to the VzW system 208 (Step 410). If the order is not for enhanced services, the VzW system 208 may handle the order independently, without involving the JMC hub 206. The enhanced services may include, for example, allowing the customer 202 to view cable on the customer's mobile phone or take the call to the customer's 202 mobile phone via the customer's television. The VzW representative goes to point of sales system 208 to input the order. As pointed out above, the VzW system 208 includes a POS terminal which is a computerized device installed at a front-end POS to deal with transactions such as opening a new subscriber's account or additional mobile telephones of existing subscribers and handling orders from subscribers regarding billing and/or receiving enhanced services. The order may be a combined order for both VzW enhanced services and the MSO enhanced services. The VzW system 208 may make a determination whether the customer 202 is eligible for such VzW enhanced services and if not may take specific actions to make the customer eligible. For example, if the VzW system 208 determines that the customer 202 would need to have a new phone to become eligible for VzW enhanced services, the VzW system 208 informs the customer 202 of the same. For example, the POS terminal may display a message to the user listing the eligibility requirements and highlighting the one the user should satisfy to become eligible for the enhanced services. For another example, an e-mail or an SMS message may be sent to the user's mobile phone listing the eligibility requirements and highlighting the one the user should satisfy to become eligible for the enhanced services.

The VzW representative may find the MSO that provides enhanced services for the customer 202 (Step 412). For example, the VzW representative may get the address from the customer 202 and find if there is an MSO that provides enhance services for that address. If so, the VzW system 208 may send an eligibility request to the MSO 204 to determine whether the customer 202 is eligible for receiving enhanced services (Step 414). If the customer 202 does not have an account with the MSO 204, then the MSO 204 will inform the VzW system 208 of the same. At this point, the VzW system 208 may inform the customer 202 and may request the customer 202 to sign up for an account with the MSO 204 directly or through the VzW system 208. If the customer 202 has an existing account with the MSO 204 but the account is not eligible for enhanced services, the MSO 204 may inform the VzW system 208 of the same and may also inform the VzW system 208 of the eligibility requirements. The VzW system 208 may provide the customer 202 with a venue to meet the MSO's 204 eligibility requirements or may direct the customer to contact the MSO 204 directly to meet the MSO's 204 eligibility requirements.

Assuming the customer 202 already has an account with the MSO 204 and the account is eligible for receiving enhanced services, the MSO 204 confirms the account eligibility to the VzW system 208 (Step 416). With MSO eligibility confirmed, VzW system 208 continues to process the order for joint services and requests a JID for the new VzW account (note that if the account is pre-existing, a JID may already exist for the account).

The VzW system 208 may request the JMC hub 206 for creation of a JID for the customer 202 (Step 418). In response, the JMC hub 206 creates the JID for the customer 202 (Step 420) and returns the JID to the VzW system 208 (Step 422). To create the JID (Step 420), the JMC hub 206 may use the oracle database sequencing tool. The sequencing tool may create a unique JID value. The JID value may be numeric, alphabetic or a combination of the numbers and alphabets. The VzW system 208 records the JID in its internal system. In one example, the VzW system 208 records the JID in a billing system for storing the customer's information. Assuming this is a new order for a new account, the VzW system 208 sets up a VzW account for the customer 202 (Step 424) and assigns the JID to the account (Step 426). The VzW system 208 also creates a new VzW customer ID for the account. If this is an update to an existing account then the account will already be active in the VzW system 208 and the VzW system 208 creates a VzW customer ID for the existing account and assigns the JID along with the VzW customer ID to the existing account.

Having set up the VzW account, VzW system 208 informs the MSO 204 of the order for enhanced service and submits the MSO part of the order to the MSO 204 (Step 428). The MSO 204 receives the order and creates a MSO customer ID for the account associated with the user (Step 430). In keeping with the previous example, it is assumed that the customer ID is an adhoc/temporary number associated with the account of the customer 202 in the MSO 204. The MSO 204 then reports the MSO customer ID to the VzW system 208 (Step 432). At this point, the VzW system 208 marks the order as complete (Step 434). The VzW system 208 also updates the JID record at the JMC hub 206 with the MSO customer ID (Step 436). The JID update message may include a Partner ID identifying the cable partner for which the JID is being requested. The Partner ID identifies the MSO 204 which has entered into a joint agreement with the VzW system 208 for offering enhanced service. The update may also include the VzW customer ID and the MSO customer ID. In keeping with the previous example, the VzW customer ID is an adhoc/temporary number associated with the account of the customer 202 in the VzW system 208. The VzW customer ID may be stored in the billing system of the VzW system 208 and may be associated with the customer's account number. To this end, the VzW system 208 can later reference the number to determine the customer's subscription to the enhanced services. The update may be submitted through an API and via a communication tunnel such as, for example, a VPN established between the VzW system 208 and the JMC hub 206. The update message may also include account status information. The account status information may describe the status of the customer's account at the VzW system 208 and at the MSO 204.

Upon receiving the JID update message from the VzW system 208, the JMC hub 206 updates the JID record (Step 438) and confirms the update to the VzW system 208 (Step 440). The JMC hub 206 may also update the JID status from "Not Ready" or "Pending" to "Ready" (Step 442). In this connection, the JMC hub 206 may reference the account status of the customer 202 at the VzW system 208 and the MSO 206 and based on the account status of the customer 202 at the VzW system 208 and the MSO 206 make a determination for the JID status. In this case, if the VzW system 208 and the MSO 206 have both account ready status, the JID status is also set to "Ready." The JMC hub 206 informs the VzW system 208 of the new JID status (Step 444), and the VzW system 208 records the new JID status against the VzW customer profile. The notification message to the VzW system 208 may include the VzW customer ID, the JID, and the new JID status. Alternatively, the notification message to the VzW system 208 may include only the JID and the new JID ready status. Similarly, the JMC hub 206 informs the MSO 204 of the new JID status (Step 446), and the MSO 204 records the new JID status against the MSO customer profile. The notification message to the MSO 204 may include the MSO customer ID, the JID, and the JID status.

In process 400, the MSO 204 provided the MSO customer ID to the VzW system 208, and the VzW system 208 update the JID record with the MSO customer ID. In a different implementation, the MSO 204 may receive the JID from the VzW system 208 and may update the JID record at the JMC hub 206. To this end, upon receiving the JID from the VzW system 208 and creating the MSO customer ID, the MSO 204 submits the MSO customer ID and the JID to the JMC hub 206.

Previously described processes are generally applicable where new accounts are being established by the VzW system 208 and the appropriate MSO 204. Where accounts are already established or where one account (VzW or MSO) is established and the other (MSO or VzW) is new, a self registration process can be used to support the associating of the accounts. The application for the self registration process may be downloaded to the VzW device and activated by the customer 202. The application may identify itself with the VzW system 208. The VzW system 208, having received the authentication request, creates a JID and records the JID against the active VzW account. The JID may then be passed to the application, which then requests that the customer 202 authenticate to the MSO 204. The authentication may be performed using login credentials previously provided to the customer 202. The application may then pass the JID to the MSO 204 and the MSO 204 may update the JID record at the JMC hub 206 with the MSO customer ID and records the JID reference against the active MSO account. Once the JID is set up, the JMC hub 206 may process the status and notify the VzW system 208 and MSO 204 of the current status of the JID. The interactions between the MSO 204, VzW system 208, and JMC hub 206 in the self registration process is shown in more detail in FIG. 5.

FIG. 5 illustrates an exemplary self registration process 500 for assignment of JID and linking accounts 102 and 104 shown in FIG. 1. The process 500 begins with the customer accessing the self registration application 502 (Step 510). The application 502 may be one of the applications on the customer's mobile device. Alternatively or additionally, the application 502 may be hosted in a server at the VzW system 208 and may be accessible via a web browser over a network.

The self registration application 502 identifies with the VzW system 208 (Step 512). The self registration application 502 provides the VzW system 208 with authentication information. The authentication information may include the customer login information, which was previously assigned to the customer by the VzW system 208. The authentication information may also include information about the customer's desire to subscribe to enhanced services such as, for example, a customer's request to view cable on the customer's mobile phone or take the call to the customer's mobile phone via the customer's TV. The VzW system 208 performs the device authentication (Step 514). As a part of the authentication, the VzW system 208 may also check to see if the customer is eligible to receive enhanced services. If not, the VzW system 208 may request that the customer take specific action to become eligible for enhanced services. For example, the POS terminal may display a message to the user listing the eligibility requirements and highlighting the one the user should satisfy to become eligible for the enhanced services. For another example, an e-mail or an SMS message may be sent to the user's mobile phone listing the eligibility requirements and highlighting the one the user should satisfy to become eligible for the enhanced services. The VzW system 208 may request the JID for the customer from the JMC hub 206 (Step 516). The JMC hub 206 creates the reference JID (Step 518) and returns the JID to the VzW system 208 (Step 520). The VzW system 208 records the JID against the customer's profile (Step 522).

The VzW system 208 forwards the JID to the self registration application 502 (Step 524). The self registration application 502 subsequently requests the customer to log into the MSO 204 (Step 526), and the login information for the MSO 204 are received at the user device in Step 528. To this end, the self registration application 502 acts as a proxy to the MSO 204. The self registration application 502 forwards the login information to the MSO 204 (Step 530), which will authenticate the customer to the MSO system 204 (Step 532) and confirm the authentication to the self registration application 502 (Step 534).

Upon receiving the confirmation, the self registration application 502 forwards the JID to the MSO 204 (Step 536). In response, the MSO 204 updates its record to include the JID therein. Specifically, the MSO 204 updates the customer's profile to include the JID information (Step 538). The MSO 204 may also create a MSO customer ID for the customer if one is not already generated. The MSO 204 then forwards the MSO customer ID along with the JID to the JMC hub 206 (Step 540). The JMC hub 206 updates the JID record to include therein the MSO customer ID (Step 542) and subsequently confirms the update to the MSO 204 (Step 544). In response, the MSO 204 confirms registration to the self registration application 502 (Step 546). The self registration application 502 then confirms the registration to the customer (Step 548).

The JMC hub 206 also updates the status of the JID to "Ready" based on the status received from the MSO 204 and VzW system 208 (Step 550). The JMC huh 206 then informs the VzW system 208 of the new JID status (Step 552). The VzW system 208 updates the VzW customer profile to include the new JID status. The JMC hub 206 will also inform the MSO 204 of the new JID status (Step 554). The MSO 204 updates the MSO customer profile to include the new JID status.

Figure 6:
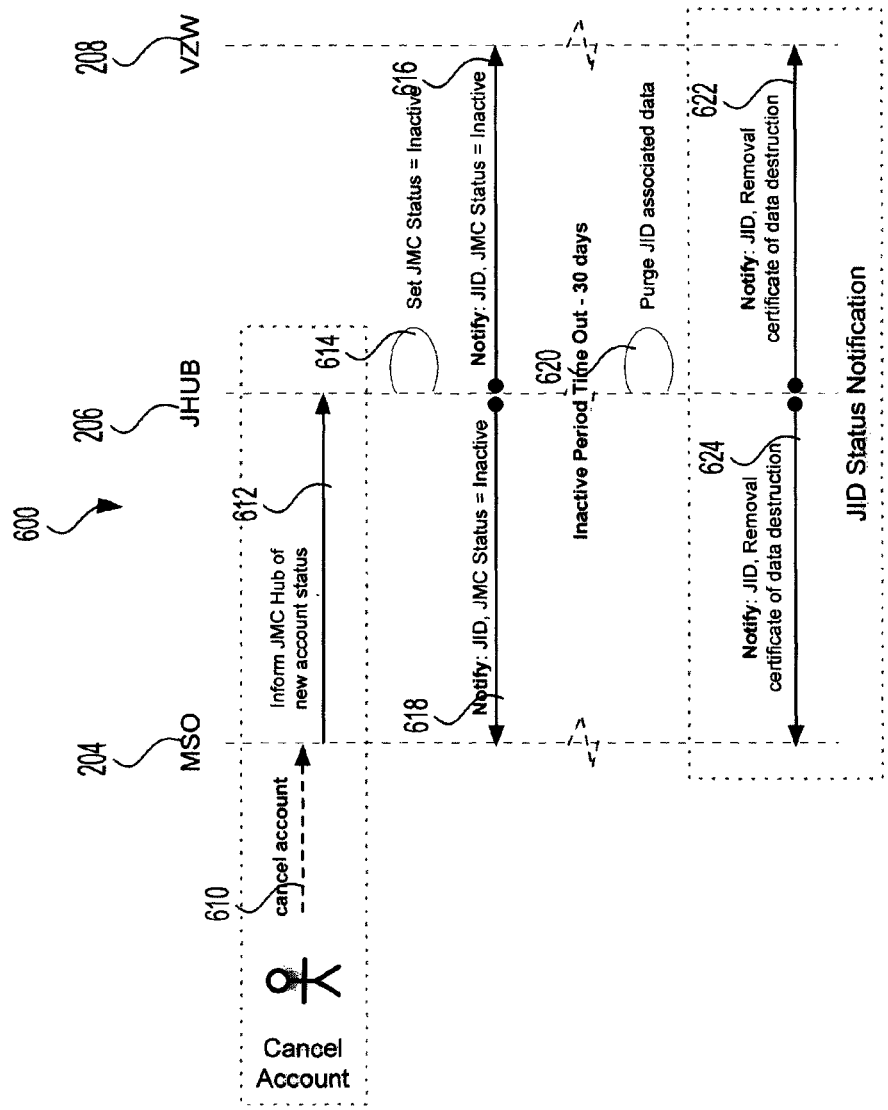
FIG. 6 illustrates an exemplary cancellation process for cancelling of the MSO account shown in FIG. 1.

FIG. 6 illustrates an exemplary cancellation process 600 for cancelling of an MSO account. The cancellation of the VzW or MSO account may cause the loss of access to joint services. However, a record of the change in status for the account may be maintained in the JMC status and the JID itself may not be torn down until a set period of time has elapsed.

The process 600 begins with the user submitting a cancellation account request to the MSO 204 (Step 610). The MSO 204 cancels the account and reports the same to the JMC hub 206 (Step 612). The JMC hub 206 recognizes the change of status in the MSO account and sets the JID status to inactive (Step 614). The JMC hub 206 then informs the VzW system 208 and the MSO 204 of the new JID "Inactive" status (Steps 616 and 618). The JMC hub 206 may maintain a timer to determine the amount of time (e.g., number of days) the JID status remains inactive. If the number of days passes a certain threshold (e.g., 30 days), the JMC hub 206 may purge the JID record (Step 620). The JMC hub 206 may then inform the VzW system 208 and the MSO 204 of the purging of the JID record (Steps 622 and 624). The VzW system 208 and MSO 204 may also remove the JID along with the VzW customer ID and the MSO customer ID from the customer's profile in each of their databases.

A number of JID status changes can occur triggered by a variety of VzW or MSO account changes. For example, in addition to the cancellation scenario described above, a JID status change may be based on re-activation of a previously cancelled account within the threshold time period. In keeping with the previous example, the flow of FIG. 7 shows the JID status change based on activation of the previously cancelled MSO account.

Figure 7:
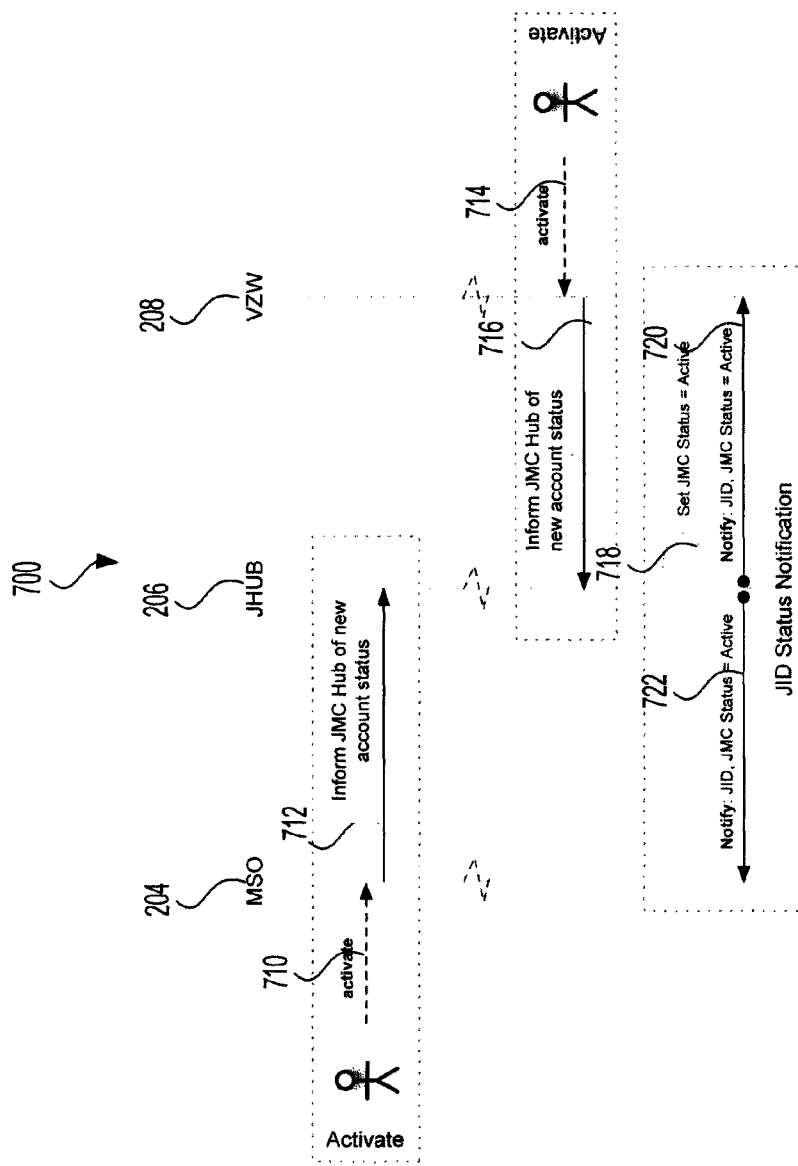
FIG. 7 illustrate an exemplary activation process showing a JID status change from inactive to active.

FIG. 7 illustrate an exemplary activation process 700 showing the JID status change from inactive to active. The process 700 begins with the customer submitting an activation request to activate the previously cancelled account at the MSO 204 (Step 710). The MSO 204 sends a message to JMC hub 206 to inform the JMC hub 206 of the new account status at the MSO 204 (Step 712). The customer may also submit an activation request to activate the previously cancelled account at the VzW system 208 (Step 714). Similar to the MSO 204, the VzW system 208 also informs the JMC hub 206 of the new account status at the VzW system 208 (Step 716). Based on the status information received from the VzW system 208 and the MSO 204, the JMC hub 206 sets an active status for JID (Step 718) and reports the new JID status to the VzW system 208 and the MSO 204 (Steps 720 and 722).

Customer consent may be a pre-requisite to the associating of a VzW and associated MSO account and may be part of the MSO, VZW and Self Registration processes. Retraction of customer consent may break the association and remove shared data. The customer consent may consist of agreeing to terms and conditions including the need for data sharing between the MSO and VzW.

As noted above, the JMC hub 206 may be responsible for maintaining the accurate status of JID for each account relationship (e.g., pairing between VzW and MSO accounts). The JID status may be in one of multiple (shown herein as five) valid states with transitions: (1) Ready, the initial state for a JID if the customer has provided a consent to pair VzW and MSO accounts; (2) Pending, a state that represents an expectation of becoming Active; (3) Active, when VzW system 208 and MSO 204 indicate eligibility; (4) Suspend, when VzW system 208 or MSO 204 indicates ineligibility, which may be temporary and can change based upon further notifications from VzW system 208 or MSO 204, or may be time based (in which case the JMC hub 206 may maintain rules to change this automatically); and (5) Inactive, the end state prior to removal of the JID reference. After a period of time in the Inactive state (or immediately upon entering the Inactive state as business rules dictate), reference to the JID and its status may be removed from the JMC hub 206 and the VzW system 208 and MSO 204 may be notified that their JID data is no longer valid. In one implementation, only the Active status allows the MSO system 204 and the VzW system 208 to provide the customer with the enhanced services.

A sub-set of the state changes may be implemented for the JID. The JMC hub 206 contains rules and handle the sub-set of state changes programmatically to map each of the MSO and VzW status to an overall JID status as shown in Table 200 below. The sub-set may include an initial state creation, establishing the JID and establishing a Ready status. The initial state may happen in the JMC hub 206 and upon receiving a request from MSO 204 or the VzW system 208 a request for a JID. The sub-set may also include a pending sub state, where the necessary conditions are required by both the VzW system 208 and the MSO 204 for a given state change (e.g., the change from Ready to Active may require both the VzW system 208 and the MSO 204 to indicate Active eligibility) or where either the VzW system 208 or the MSO 204 can present the necessary condition for a state change (e.g., the change from Active to Inactive that can occur when the VzW system 208 or the MSO 204 indicate that their account has been closed and is now Inactive). The pending state may also happen in the JMC hub 206. The sub-set may also include a final state removal, clearing all records of the JID and its associations as takes place after a JID has remained in an inactive state for, for example, 30 days.

Figure 8:
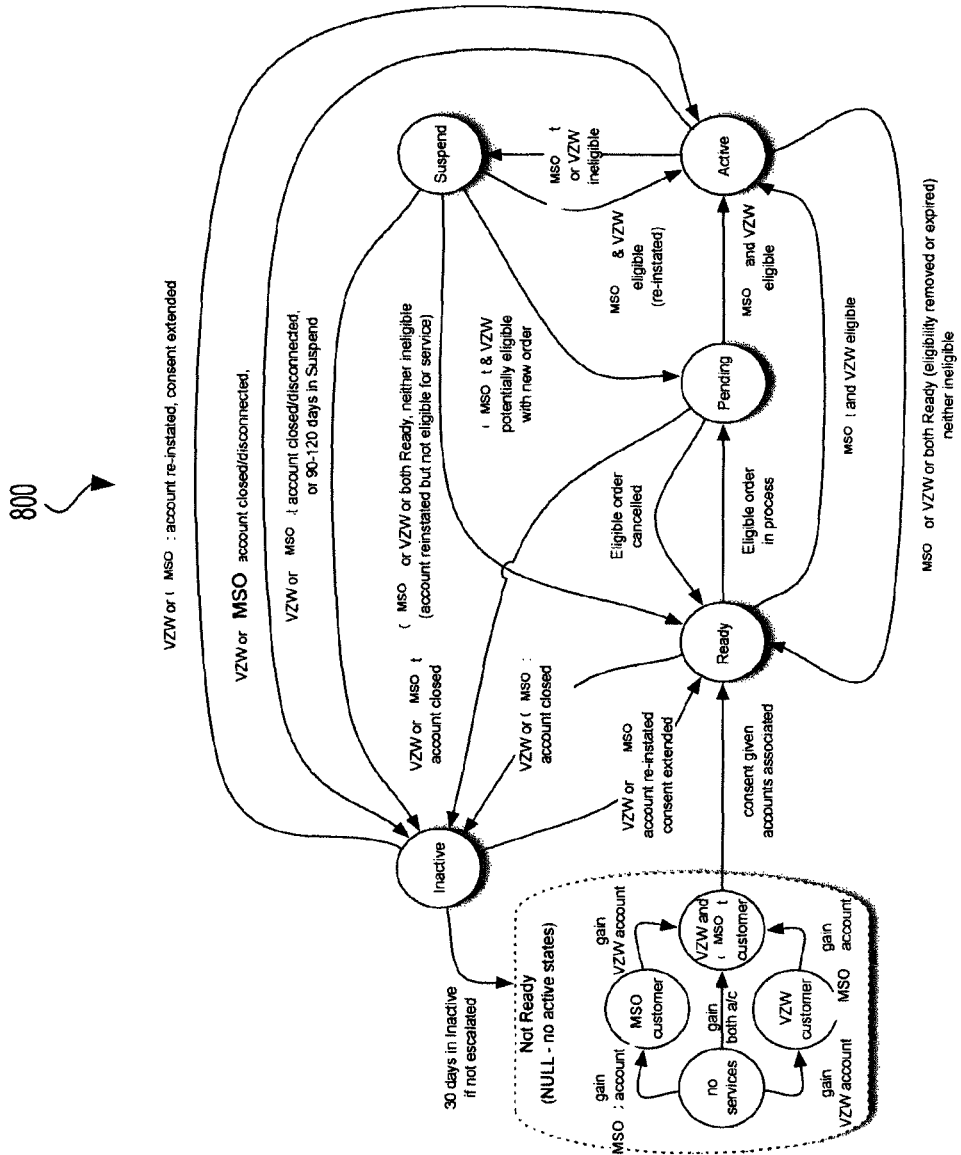
FIG. 8 illustrates an exemplary transition diagram showing JID status change triggered by the account status change at the VzW and the MSO.

FIG. 8 illustrates an exemplary transition diagram 800 showing JID status change triggered by the account status change at the VzW system 208 and the MSO 206. The table 200 below shows the JID status at the JMC hub 206 based on the VZW JMC account status and the MSO JMC account status.

TABLE 200

| READY | (null) | NOT READY |
| --- | --- | --- |
| READY | READY | READY |
| READY | SUSPEND | SUSPEND |
| READY | IN-ACTIVE | IN-ACTIVE |
| READY | ACTIVE | READY |

TABLE 200-continued

| | | |
|---|---|---|
| READY | PENDING | PENDING |
| (null) | READY | NOT READY |
| ACTIVE | (null) | NOT READY |
| ACTIVE | READY | READY |
| ACTIVE | SUSPEND | SUSPEND |
| ACTIVE | IN-ACTIVE | IN-ACTIVE |
| ACTIVE | ACTIVE | ACTIVE |
| ACTIVE | PENDING | PENDING |
| (null) | ACTIVE | NOT READY |
| SUSPEND | (null) | NOT READY |
| SUSPEND | READY | SUSPEND |
| SUSPEND | SUSPEND | SUSPEND |
| SUSPEND | IN-ACTIVE | IN-ACTIVE |
| SUSPEND | ACTIVE | SUSPEND |
| SUSPEND | PENDING | SUSPEND |
| (null) | SUSPEND | NOT READY |
| IN-ACTIVE | (null) | NOT READY |
| IN-ACTIVE | READY | IN-ACTIVE |
| IN-ACTIVE | SUSPEND | IN-ACTIVE |
| IN-ACTIVE | IN-ACTIVE | IN-ACTIVE |
| IN-ACTIVE | ACTIVE | IN-ACTIVE |
| IN-ACTIVE | PENDING | IN-ACTIVE |
| (null) | IN-ACTIVE | NOT READY |
| PENDING | (null) | NOT READY |
| PENDING | READY | PENDING |
| PENDING | SUSPEND | SUSPEND |
| PENDING | IN-ACTIVE | IN-ACTIVE |
| PENDING | ACTIVE | PENDING |
| PENDING | PENDING | PENDING |
| (null) | PENDING | NOT READY |
| (null) | (null) | NOT READY |

To this end, the instant application describes a JMC hub 206 for linking of the accounts associated with customers of a mobile communication network provider (e.g., VzW) and a content provider (e.g., MSO) who have entered into a joint relationship agreement. The linked accounts in the VzW system 208 and the MSO 204 may access the enhanced services offered by the virtue of joint relationship agreement between the VzW system 208 and the MSO 204. Each of the linked accounts in the VzW system 208 and the MSO 204 may include a JID created by the JMC hub 206.

The JMC hub 206 may include those functions necessary to support the creation and management of the JID. The JMC hub 206 may create the JID based upon triggers/notifications from the MSO 204 and/or the VzW system 208. The JID includes a status identifier which is controlled by the JMC hub 206. If the status identifier is active, both the MSO 204 and the VzW system 208 allow access to the enhanced services; otherwise, the access may be denied until the JID status becomes active for each of the VzW and MSO accounts. The JMC hub 206 may provide notification to the VzW system 208 and the MSO 204 as JID status changes.

The JMC hub 206 may perform JMC assignment and mapping via JID Primary to Primary account mapping between the MSO 204 and the VzW system 208. This may be done with "account numbers." Alternatively or additionally, this may be done with unique identifiers (customer IDs) from the partners. In this manner, the JMC hub 206 may resolve the concern from both the VzW system 208 and the MSO 204 about sharing customer information across companies. Neither the VzW system 208 nor the MSO 204 need to own the platform with cross company information.

As shown by the above discussion, functions relating to allowing the customer to register for enhanced services offered by a joint agreement between the VzW system 208 and the MSO 204 may be implemented on computers connected for data communication via the components of a packet data network, operating as MSO 204, JMC hub 206, and the VzW system 208 as shown in FIG. 2. Although special purpose devices may be used, such devices also may be implemented using one or more hardware platforms intended to represent a general class of data processing device commonly used to run "server" programming so as to implement the functions for generating JID for linked accounts, which were discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data, e.g., files used for generating JID for linked accounts. The software code is executable by the general-purpose computer that functions as JMC hub. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for generating the JID for linked accounts in essentially the manner performed in the implementations discussed and illustrated herein.

Figures 9, 10:
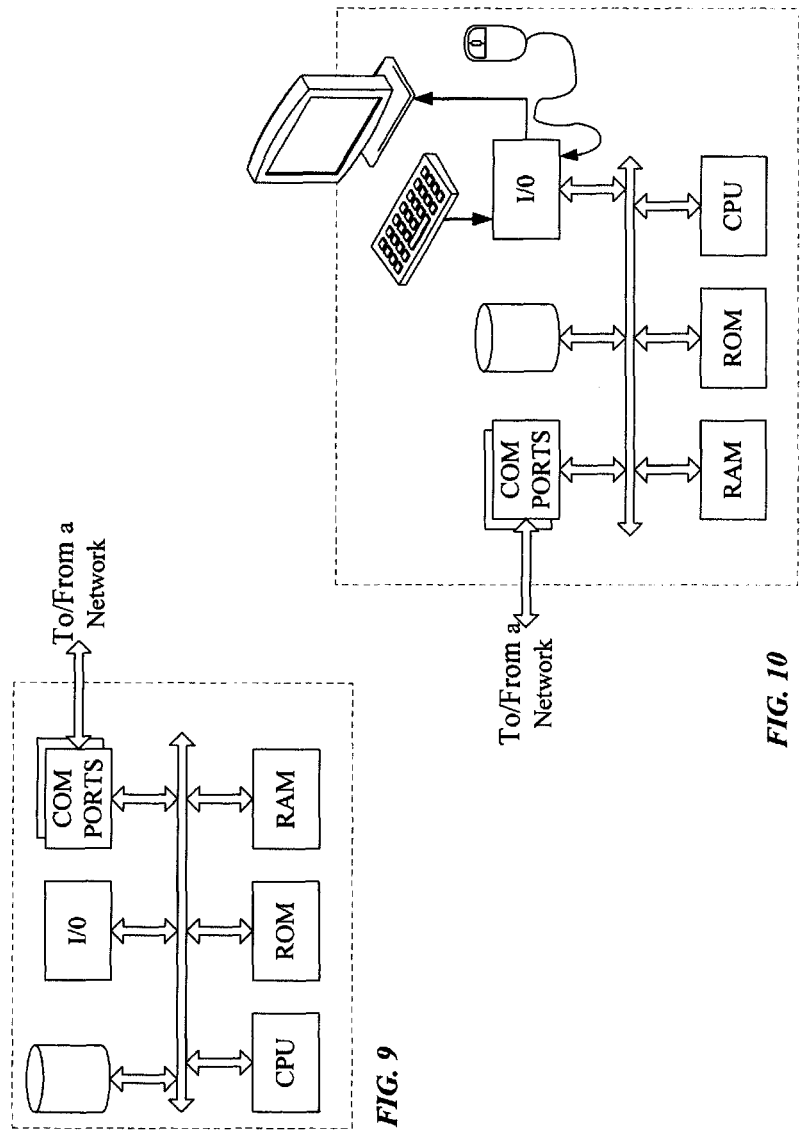
FIG. 9 illustrates a network or host computer platform, as may typically be used to implement a server.
FIG. 10 depicts a computer with user interface elements, as may be used to implement a personal computer or other type of work station or terminal device.

FIGS. 9 and 10 provide functional block diagram illustrations of general purpose computer hardware platforms that may form at least part of the JHUB. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data tiles to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs. A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of generating the JID for linked accounts outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the wide area network provider (e.g., LTE network provider) into the computer platform of the JMC hub. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functionalities relating to generating the JID for linked accounts shown in the drawings. Volatile storage media includes dynamic memory, such as main memory of such a computer platform. Tangible transmission media includes coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, the mobile communication network provider (e.g., VzW 208) may be associated with multiple MSOs for multiple clients. Each MSO may include a Partner ID. The JMC hub creates a JID and assigns the JID to each of the MSOs. For example, two customers located in Seattle, Wash. may have access to both Comcast and FIOS for receiving TV services. Each of the Comcast and FIOS provider may join the mobile communication network provider to provide the customers with enhanced services.

For example, if one customer wishes to receive enhanced services offered by the join agreement between the FIOS provider and the mobile communication network provider, the customer requests the service and submits consent to the association of the customer's FIOS account and the mobile provider account at the JMC hub. The JMC hub creates a JID, forwards the JID to the FIOS and the mobile provider, and once the JID achieves an active status based on discussion above, the JMC hub provides the enhanced services to the user. For another example, if the other customer wishes to receive enhanced services offered by the joint agreement between the Comcast provider and the mobile communication network provider, the customer requests the service and submits consent to the association of the customer's Comcast account and the mobile provider account at the JMC hub. The JMC hub creates another JID, forwards the JID to Comcast and the mobile provider, and once the JID achieves an active status, the JMC hub provides the enhanced services to the user.

The JMC hub may provide support for maintenance and replication of JMC hub data. For example, the JMC hub may support vertical and horizontal scaling of data to insure the JMC hub grows as the customer base grows. The MSO and VzW may have secure access to the JMC hub and its database. The secure access may identifies the individuals who can access the hub from different partners and their level of access. The level of access may define what the individual can see and what kind of updates and/or audits the individual can perform. For example, the individual may be given access to update the audit logs which keep record of all hub's activities.

The JMC hub may also include a refresh function so should the hub crash all hub's data may be reloaded back to the JMC hub. The data may be reloaded from a remote server. Alternatively, the data may be obtained from the MSO and VzW.

The partners may communicate with the JMC hub using an interface. For example, the JMC hub may allow opening of a particular API, that is going to expose the status of the JID. Then, when the VzW or MSO wants this information the VzW or the MSO can make a call to this interface to pull the information from the JMC hub. The Request HD interface allows the VzW to request a JID from the hub. The update JID interface allows the VzW and the MSO to update data associated with a JID but separate from modification of the JID status. The Confirm Account Submit interface allows the MSO to confirm and update a previously established MSO reference of a JID record. Similarly, the Confirm Account Submit interface may allow the VzW to confirm and update a previously established MSO reference of a JID record. The Set JID Status allows the VzW or the MSO to update their status associated with an account as referenced by a JID. The Set JID Status Notification allows the JMC hub to notify the VzW and the MSO of the JID status update.

Other implementations are contemplated. It is intended by the following claims to claim any and all applications, modifications and variations that fall within the true scope of the present teachings. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at a hub computer over a network and from a first partner computer, a request for a common identifier for linking a first customer account of a customer having a first customer information associated with the first partner computer with a second customer account of the customer having a second customer information associated with a second partner computer to provide the customer with enhanced joint account services across the first and second partner computers;
   in response to the request, generating the common identifier at the hub computer to share the first customer information with the second partner computer and share the second customer information with the first partner computer by pairing the first and second accounts;
   providing the common identifier to the first partner computer and the second partner computer over the network to provide the customer with enhanced joint account services across the first and second partner computers;
   receiving over the network at the hub computer a first partner customer ID associated with the account of the customer at the first partner computer, a second partner customer ID associated with the account of the customer at the second partner computer, a first partner customer ID status identifying a status of the first partner customer ID relating to receiving enhanced joint account services at the first partner computer, and a second partner customer ID status identifying a status of the second partner customer ID relating to receiving enhanced joint account services at the second partner computer;
   updating at the hub computer a record associated with the common identifier to link the common identifier with the first partner customer ID and the second partner customer ID;
   generating at the hub computer a common ID status associated with the common identifier and based on the first partner customer ID status and the second partner customer ID status to disable enhanced joint account services across the first and second partner computers, the generating the common ID status including:
      upon determining the first partner customer ID status is set to a ready status to indicate the first partner computer gained consent from the customer to share the first customer information with the second partner computer and that the second partner customer ID status is set to a suspend status to indicate that the customer has become ineligible at the second partner computer for receiving enhanced joint account services, setting the common ID status to a suspend status to disable enhanced joint account services for the customer across the first and second partner computers;
   after setting the common ID status to the suspend status, forwarding the common ID status associated with the common identifier to the first partner computer and the second partner computer to disable enhanced joint account services for the customer across the first and second partner computers;
   after changing the common ID status to the suspend status, determining whether a first allotted time window is exceeded;
   upon determining the first allotted time window is exceeded, changing the common ID status from the suspend status to an inactive status;
   after changing the common ID status to the inactive status after the first allotted time window, determining whether a second allotted time window is exceeded; and
   upon determining the second allotted time window is exceeded, purging, at the hub computer, the record associated with the common identifier.

2. The method of claim 1, wherein the first partner customer ID includes a first actual account number or a first adhoc/temporary number associated with the account of the customer at the first partner computer and the second partner customer ID includes a second actual account number or a second adhoc/temporary number associated with the account of the customer of the customer at the second partner computer, the first account number, the first adhoc/temporary number, the second account number, or the second adhoc/ temporary number being flagged to show that the customer is registered for receiving the enhanced joint account services.

3. The method of claim 1, wherein the steps of generating the common identifier, updating the record associated with the common identifier, generating the common ID status associated with the common identifier are performed at the hub computer independent of an origin of the request for the common identifier.

4. The method of claim 1, wherein the request is submitted through an API via a communication tunnel.

5. The method of claim 1, wherein the request for the common identifier is received only from the first partner computer, the first partner computer being a mobile communication network provider.

6. The method of claim 1, wherein:
receiving the first partner customer ID and the first partner customer ID status includes receiving the first partner customer ID and the first partner customer ID status from the first partner computer, and
receiving the second partner customer ID and the second partner customer ID status includes receiving the second partner customer ID and the second partner customer ID status from the second partner computer.

7. The method of claim 1, wherein each of the first partner customer ID status and the second partner customer ID status is one of a ready, pending, active, or inactive status.

8. The method of claim 1, further comprising:
receiving an update to the first partner customer ID status or the second partner customer ID status; and
changing the common ID status from an active status to an inactive status based on the update to the first partner customer ID status or the second partner customer ID status.

9. The method of claim 8, further comprising:
monitoring, at the hub computer, the inactive status of the common ID to determine whether the inactive status has persisted more than a threshold amount of time; and
upon determining that the inactive status has persisted more than the threshold amount of time, deleting at the hub the common identifier along with the record associated with the common identifier.

10. The method of claim 9, further comprising instructing the first partner and the second partner computers to delete the common identifier from respective records upon determining that the inactive status has persisted more than the threshold amount of time.

11. A hub computer comprising:
a processing device; and a memory storing executable instructions for causing the processing device to:
receive, over a network from a first partner computer, a request for a common identifier for linking a first customer account of a customer having a first customer information associated with the first partner computer with a second customer account of the customer having a second customer information associated with a second partner computer to provide the customer with enhanced joint account services across the first and second partner computers;
in response to the request, generate the common identifier and provide the common identifier to the first partner computer to share the first customer information with the second partner computer and share the second customer information with the first partner computer by pairing the first and second accounts;
receive over the network a first partner customer ID associated with the account of the customer at the first partner computer, a second partner customer ID associated with the account of the customer at the second partner computer, a first partner customer ID status identifying a status of the first partner customer ID relating to receiving enhanced joint account services at the first partner computer, and a second partner customer ID status identifying a status of the second partner customer ID relating to receiving enhanced joint account services at the second partner computer;
update a record associated with the common customer ID to link the common customer ID with the first partner customer ID and the second partner customer ID;
generate a common ID status associated with the common ID based on the first partner customer ID status and the second partner customer ID status to disable enhanced joint account services across the first and second partner computers, the generating the common ID status including:
upon determining the first partner customer ID status is set to a ready status to indicate the first partner computer gained consent from the customer to share the first customer information with the second partner computer and that the second partner customer ID status is set to a suspend status to indicate that the customer has become ineligible at the second partner computer for receiving enhanced joint account services, set the common ID status to a suspend status to disable enhanced joint account services for the customer across the first and second partner computers;
after setting the common ID status to the suspend status, forward the common ID status associated with the common ID to the first partner computer and the second partner computer to disable enhanced joint account services for the customer across the first and second partner computers;
after changing the common ID status to the suspend status, determine whether a first allotted time window is exceeded;
upon determining the first allotted time window is exceeded, change the common ID status from the suspend status to an inactive status;
after changing the common ID status to the inactive status after the first allotted time window, determine whether a second allotted time window is exceeded; and
upon determining the second allotted time window is exceeded, purge, at the hub computer, the record associated with the common identifier.

12. The hub computer of claim 11, wherein the first partner customer ID includes a first actual account number or a first adhoc/temporary number associated with the account of the customer at the first partner computer and the second partner customer ID includes a second actual account number or a second adhoc/temporary number associated with the account of the customer of the customer at the second partner computer, the first account number, the first adhoc/temporary number, the second account number, or the second adhoc/temporary number being flagged to show that the customer is registered for receiving the enhanced joint account services.

13. The hub computer of claim 11,
wherein to receive the first partner customer ID and the first partner customer ID status the memory stores executable instructions for causing the processing device to receive the first partner customer ID and the first partner customer ID status from the first partner computer, and
wherein to receive the second partner customer ID and the second partner customer ID status the memory stores executable instructions for causing the processing device to receive the second partner customer ID and the second partner customer ID status from the second partner computer.

14. The hub computer of claim 11, wherein the first partner customer ID status and the second partner customer ID status includes one of ready, pending, active, or inactive statuses.

15. The hub computer of claim 11, the memory further stores executable instructions for causing the processing device to:
receive an update to the first partner customer ID status or the second partner customer ID status; and
change the common ID status from a first status to a second and a different status based on the update to the first partner customer ID status or the second partner customer ID status.

16. The method of claim 1, further including:
after forwarding the suspend status of the common ID status to the first and second partner computers, receiving a message that the second partner customer ID status is updated at the second partner computer, the message including an update that the second partner customer ID status is set to ready status to indicate the second partner computer gained consent from the customer to share the second customer information with the first partner computer; and
upon determining that the both the first partner customer ID status remains set to ready status and the update to the second partner customer ID status is set to ready status, changing the common ID status from the suspend status to the ready status.

17. The method of claim 16, further including:
after changing the common ID status to the ready status, forwarding the common ID status to the first partner computer and the second partner computer over the network; and
allowing enhanced joint account services across the first partner and second partner computers for the customer in response to the change of common ID status to the ready status.

18. The method of claim 1, further including:
after purging the record associated with the common identifier, informing the first partner computer and the second partner computer over the network of the purging of the record; and
in response to purging of the record associated with the common identifier, disabling enhanced joint account services for the customer across the first partner and second partner computers.

19. The hub computer of claim 11, further including:
after purging the record associated with the common identifier, inform the first partner computer and the second partner computer over the network of the purging of the record; and
in response to purging of the record associated with the common identifier, disable enhanced joint account services for the customer across the first partner and second partner computers.

* * * * *